United States Patent [19]

Barnaby et al.

[11] 3,876,835

[45] Apr. 8, 1975

[54] LOUDSPEAKING TELEPHONE INSTRUMENTS

[75] Inventors: Bernard Sydney Barnaby, Ware; Percy Albert Gander, Kenton; Roy James Brooker, Surrey, all of England

[73] Assignee: The General Electric Company Limited, London, England

[22] Filed: Oct. 30, 1972

[21] Appl. No.: 302,245

[30] Foreign Application Priority Data

Oct. 28, 1971 United Kingdom ............... 50210/71

[52] U.S. Cl. ............ 179/1 VC; 179/1 HF; 328/137; 328/154

[51] Int. Cl. ............................................ H04m 9/08

[58] Field of Search ..... 179/1 VC, 1 H, 1 HF, 81 B, 179/1 B; 328/146, 147, 154, 137

[56] References Cited

UNITED STATES PATENTS

| | | | |
|---|---|---|---|
| 2,964,598 | 12/1960 | Parker | 179/81 B |
| 3,075,045 | 1/1963 | Clemency | 179/81 B |
| 3,328,599 | 6/1967 | Stupar | 328/146 |
| 3,395,255 | 7/1968 | Clement | 179/1 VC |
| 3,423,531 | 1/1969 | Doddington | 179/1 VC |
| 3,725,585 | 4/1973 | Moniak | 179/81 B |

*Primary Examiner*—David L. Stewart
*Attorney, Agent, or Firm*—Kirschstein, Kirschstein, Ottinger & Frank

[57] ABSTRACT

In a loudspeaking telephone rectified voice-frequency signals for voice-switching from the send and receive paths are each applied to charge two capacitors which are periodically discharged in turn, the voltages across the two capacitors being applied by way of respective inputs of an "or" gate to a comparator which controls the switching circuits.

5 Claims, 2 Drawing Figures

LOUDSPEAKING TELEPHONE INSTRUMENTS

Figure 1:
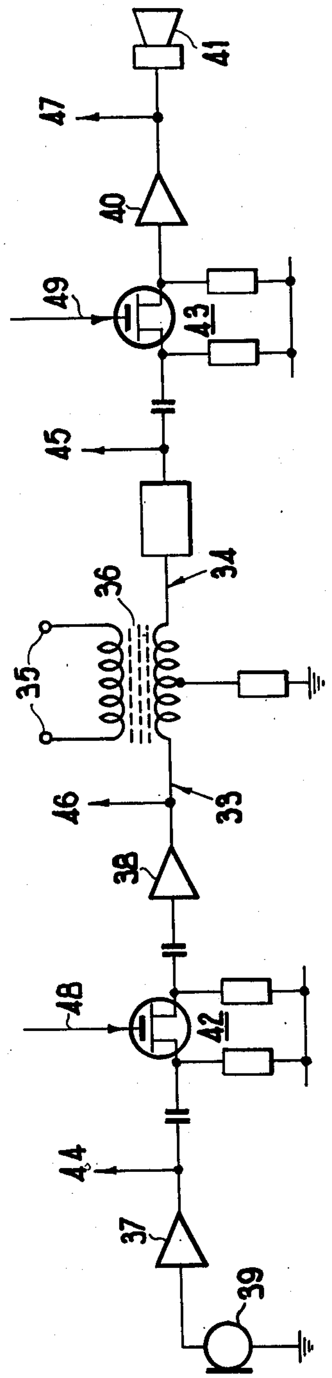

The present invention relates to loudspeaking telephone instruments.

In particular the invention relates to loudspeaking telephone instruments in which "voice-switching" is used to prevent self-oscillation or "howl" due to acoustic feedback between the loudspeaker and the microphone of the instrument. The voice-switching is effected by comparing the amplitudes of voice signals, usually after amplification, on send and receive paths in the loudspeaking telephone instrument, the instrument being switched to a substantially receive-only or to a substantially send-only mode so that in general the higher amplitude signal is passed and the lower amplitude signal is attenuated. For example, if at any time the received signal is the larger then the loudspeaking telephone is switched to the receive-only mode.

The voice signals for amplitude comparison are normally rectified and smoothed and then applied to a d.c. voltage comparator. The smoothing circuits used necessarily have a fairly long time constant for the proper smoothing of the lowest-frequency components of the voice signals which may be, say, between 60 and 100 Hertz, and following a particularly high amplitude signal on, say, the send path the voltage across the respective smoothing capacitor may take a few hundred milliseconds to fall to the level corresponding to a low amplitude signal, which may be as much as 35 decibels lower. A low amplitude received signal following immediately after a high amplitude send signal may therefore have its initial syllables seriously clipped before the loudspeaking telephone responds by switching to the receive mode.

According to the present invention in a loudspeaking telephone instrument including a voice switching arrangement by means of which in operation voice signals are substantially attenuated selectively on a send path or a receive path in dependence upon the relative amplitudes of the voice signals applied to said paths, there are provided a first group of two or more capacitors which are arranged to be charged in operation by rectified voice signals from said send path and which are arranged to be discharged periodically in turn, a second group of two or more capacitors which are arranged to be charged in operation by rectified voice signals from said receive path and which are arranged to be discharged periodically in turn, means to apply the voltage of greatest magnitude across any one capacitor in the first group and the voltage of greatest magnitude across any one capacitor in the second group to respective inputs of a voltage comparator, and switching means arranged substantially to attenuate voice signals on said send path to pass voice signals on said receive path and vice versa in dependence upon the value of the output signal of said voltage comparator, the repetition rate of discharge of said capacitors in operation being sufficiently high to permit changeover from send to receive or vice versa without appreciable clipping of initial syllables.

Preferably each group of capacitors comprises two capacitors. The means to apply the voltage of greatest magnitude across any one capacitor in a group to a respective input of the voltage comparator may comprise respective semiconductor rectifier elements connecting like terminals of each capacitor in the group to the respective input, the rectifier elements being connected in the same sense or polarity.

Figure 2:
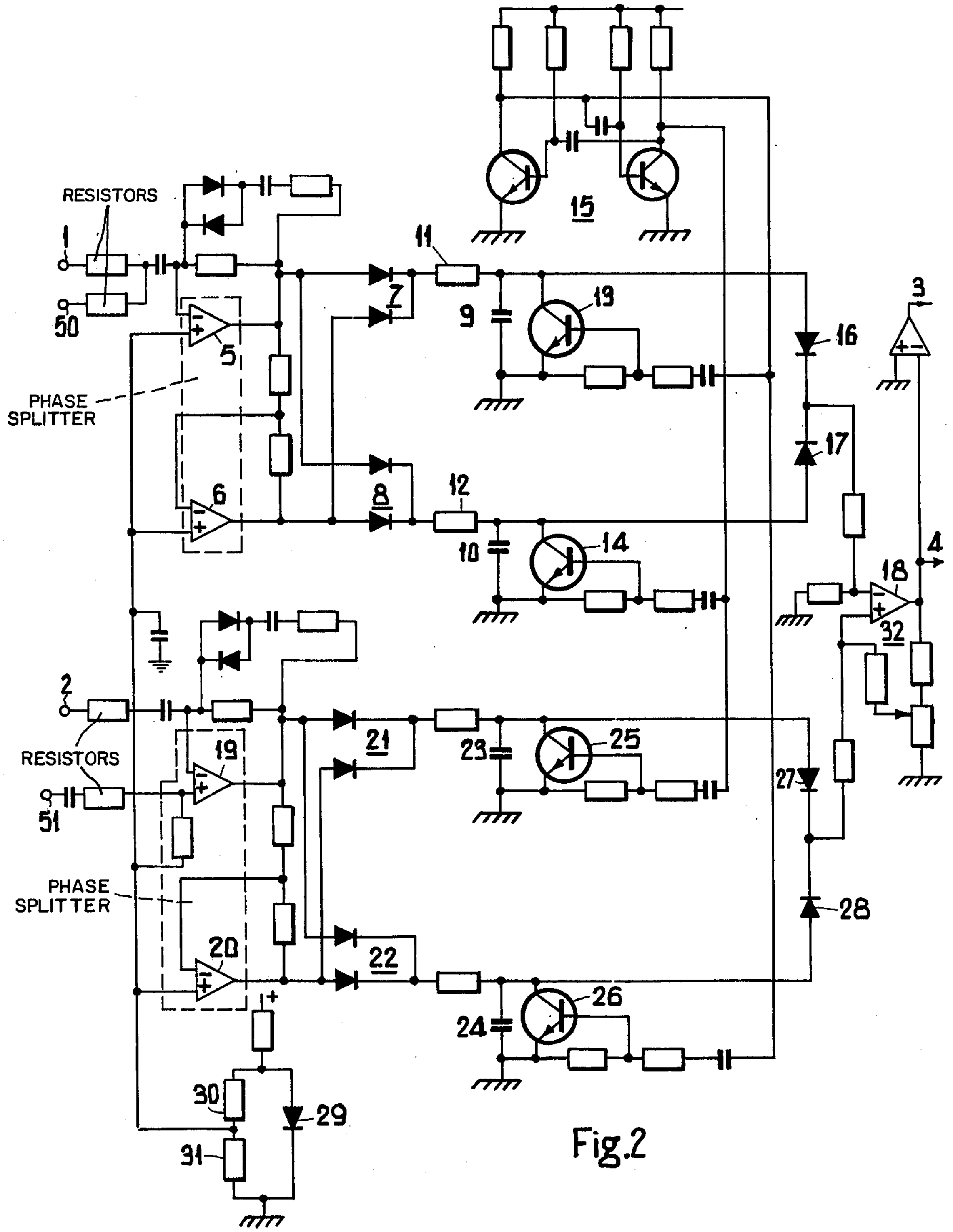

A loudspeaking telephone instrument including a voice switching arrangement in accordance with the present invention will now be described with reference to the accompanying drawings of which:

FIGS. 1 and 2 show different parts of the electric circuit of the instrument diagrammatically.

Referring first to FIG. 1 of the drawings, as in previously-known loudspeaking telephones utilizing voice-switching, for example as disclosed in United Kingdom Patent Specification No. 879,836, the output of a transmit path 33 and the input of a receive path 34 are connected to line terminals 35 for a two-wire telephone line by way of a hybrid transformer 36. Amplifiers 37 and 38 are arranged to amplify the voice signals from the microphone 39 of the loudspeaking instrument for transmission over the telephone line, and amplifier 40 is arranged to amplify incoming voice signals for application to the loudspeaker 41 of the instrument.

At an intermediate position in each of the paths 33 and 34 there is provided a respective switching circuit 42 and 43 by means of which voice signals applied to the input of the respective path may be either attenuated or allowed to pass substantially unattenuated in dependence upon the value or the polarity of a control voltage applied to the respective switching circuit.

Each of the switching circuits 42 and 43 may comprise a pair of semiconductor diodes, as described in the above patent specification, or alternatively may comprise a field effect transister as shown in FIG. 1. The control voltages for the two switching circuits 42 and 43 are derived primarily from a comparison of the amplitudes of the voice signals appearing at the points 44 and 45, with additional inputs from the points 46 and 47.

Referring now to FIG. 2 the present voice-switching arrangement has input connections 1 and 2 respectively from the points 45 and 44 respectively in the receive and send signal paths of the telephone instrument, and output connections 3 and 4 respectively to control voltage inputs 49 and 48 of the receive and the send switching circuits 43 and 42 respectively.

The input connection 1 is taken to a phase-splitting circuit comprising a pair of operational amplifiers 5 and 6, and outputs from these amplifiers are taken to full-wave or bi-phase rectifier arrangements 7 and 8 connected to respective smoothing capacitors 9 and 10. In operation these capacitors 9 and 10 tend to charge by way of current limiting resistors 11 and 12 to levels corresponding to the amplitude of voice signals applied to the input 1, the resistors 11 and 12 serving to prevent the capacitors 9 and 10 from charging to any significant extent in response to transient noise "spikes".

Connected in parallel with the capacitors 9 and 10 are the collector-emitter paths of respective n-p-n transistors 13 and 14, these transistors being switched into conduction alternately by differentiated antiphase square-wave outputs from a multivibrator 15 operating at 33 Hertz, so that the capacitors 9 and 10 are discharged in turn.

The voltages developed across the capacitors 9 and 10 are applied respectively to the anodes of semiconductor diodes 16 and 17 the cathodes of which are connected in common to one input of a comparator comprising an operational amplifier 18. The diodes 16 and 17 function as an "analogue or" gate such that the voltage of greater magnitude of the voltages across the capacitors 9 and 10 is applied to the one input of the amplifier 18. If the voice signal applied to the input 1 ceases when, say, the capacitor 9 is charging and the capacitor 10 is held substantially discharged by conduction through the transistor 14, the voltage to which the capacitor 9 is charged will continue to be applied to the one input of the amplifier 18 by way of the diode 16 until the commencement of the next half cycle of the multivibrator 15, whereafter the voltage applied to the one input of the amplifier 18 will fall abruptly to substantially earth potential.

Voice signals at the input 2 are similarly applied by way of phase splitting amplifiers 19 and 20 and rectifier arrangements 21 and 22 to charge capacitors 23 and 24, and the voltages across these capacitors, which are discharged in turn by transistors 25 and 26, are applied to the other input of the amplifier 18 by way of diodes 27 and 28 which function as a second analogue or gate.

The amplifier 18 is provided with sufficient positive feed back over a path 32 from its output to one of its inputs to make it just bistable so that it acts as a voltage sensitive trigger circuit, its output switching between two discrete voltage levels in dependence upon which of the rectified voltages is of greater magnitude. Due to "backlash" in the trigger circuit, however, one rectified voltage has to exceed the other by more than a predetermined amount before a changeover takes place, and this serves to prevent continual switching between the two voltage levels when the voice signals at the inputs 1 and 2 are of substantially the same amplitude.

Signals from the points 46 and 47 in FIG. 1, which are applied to the amplifiers 19 and 5 respectively at inputs 51 and 50, will have a similar "hysteresis" effect in that if, say, the switching circuit 42 is conductive signals from the microphone 39 reaching the input 51 by way of the point 46 will be of such a phase as to reinforce the signals from the point 44.

To avoid non-linearity in rectification of the voice signals a forward bias derived from the voltage drop across a forward biased diode 29 is applied to each of the diodes of the rectifier arrangements 7 and 8, 21 and 22 by way of the respective amplifiers 5 and 6, 19 and 20. The diode 29 is arranged to be forward biased to a voltage just above the "knee" or threshold voltage of conduction, and the proportion of this voltage applied to the rectifier diodes by way of the potential divider comprising resistors 30 and 31 ensures that these diodes are biased to just below the threshold voltage, which for germanium diodes is of the order of half a volt and for silicon diodes is of the order of threequarters of a volt.

In operation of the loudspeaking telephone utilizing the voice switching arrangement described above, in dependence upon the relative amplitudes of the send and receive voice signals applied to the inputs 1 and 2, the output of the amplifier 18, at the point 4 is arranged to switch to one or other of the above-mentioned two discrete voltage levels and the output of an inverting amplifier 33, at the point 3, to switch to the opposite voltage level. The switching circuits 42 and 43 are thereby controlled so that the voice signal of greater amplitude is passed by the respective switching circuit while the signal of lower amplitude is attenuated. When the voice signal of greater amplitude ceases, its control over the output of the amplifier 18, and hence over the state of the switching circuits 42 and 43, is maintained for no more than a cycle of the multivibrator 15, that is, for a period of no longer than thirty milliseconds. The "listening" subscriber can therefore commence speaking immediately his opposite number ceases without risk of serious clipping of his first syllable.

We claim:

1. A loudspeaking telephone instrument comprising a microphone, a send path for voice signals interconnecting said microphone and line terminals of the instrument, a loudspeaker, a receive path for voice signals interconnecting said line terminals and said loudspeaker, first and second switch means connected respectively in said send and receive paths, and voice switching means responsive to the relative amplitudes of voice signals applied to said send and receive paths to operate said switch means, said voice switching means comprising a first group of at least two capacitors, rectifier means to charge each capacitor of said first group in response to voice signals on said send path and means periodically to discharge each capacitor of said first group in turn, a second group of at least two capacitors, rectifier means to charge each capacitor of said second group in response to voice signals on said receive path, means periodically to discharge each capacitor of said second group in turn, a voltage comparator having first and second inputs, means to apply the voltage of greatest magnitude across any capacitor in the first group and the voltage of greatest magnitude across any capacitor in the second group to respective inputs of said comparator, and means to operate said switch means in dependence upon an output signal from said comparator.

2. A loudspeaking telephone instrument in accordance with claim 1 wherein each of said first and second groups comprises two capacitors.

3. A loudspeaking telephone instrument in accordance with claim 1 further comprising a multivibrator, said first and second means to discharge said capacitors comprising respective transistor switch means connected across each capacitor and means to bias each of said transistor switch means into conduction in dependence upon a respective output signal from said multivibrator.

4. A loudspeaking telephone instrument in accordance with claim 1 wherein said rectifier means to charge each capacitor comprises respective biphase rectifier arrangements.

5. A loudspeaking telephone instrument in accordance with claim 3 wherein each of said first and second switch means comprises a field-effect transistor.

* * * * *